Patented Apr. 28, 1925.

1,535,233

UNITED STATES PATENT OFFICE.

FRANCIS P. McCOLL, OF RIDGEWOOD, NEW JERSEY, AND WALTER W. WILLISON, OF BROOKLYN, NEW YORK, ASSIGNORS, BY MESNE ASSIGNMENTS, TO THERMOKEPT CORPORATION, A CORPORATION OF DELAWARE.

SELF-SEALING, SOLUBLE COFFEE TABLET AND PROCESS OF MAKING SAME.

No Drawing. Application filed December 22, 1920. Serial No. 432,517.

*To all whom it may concern:*

Be it known that we, FRANCIS P. McCOLL, a citizen of Canada, residing at Ridgewood, in the county of Bergen, State of New Jersey, and WALTER W. WILLISON, a citizen of the United States, residing at Brooklyn, in the county of Kings and State of New York, have made a certain new and useful Invention in Self-Sealing, Soluble Coffee Tablets and Processes of Making the Same, of which the following is a specification.

This invention relates to a product and process by which process a self-sealing, readily soluble, but greatly compressed, coffee unit, or tablet, is produced directly from the roasted whole coffee bean, without additional ingredients or intermediate steps of grinding, and without any material loss of the essential or valuable constituents of the coffee bean.

It is the object of our invention to produce a new and valuable coffee unit possessing the aforesaid characteristics, and others hereinafter set out, by applying a crushing stress to the whole coffee bean, in the manner and under the conditions stated more fully below, so as to completely break all the coffee cells and at the same time compress the broken cell mass and contents, in desired quantity, into a finished unit or tablet.

We have found that by thus crushing the roasted coffee bean, or a desired number of roasted coffee beans, in a confined space, the oil contained in the cells and fibre will, not only be set free and will completely saturate the coffee fibre, thereby being placed in a favorable condition to be readily dissolved by the hot water when coffee is made, but will at the same time serve as a binding and sealing medium for the coffee fibre to form the finished article, which is thereby made more or less impregnable to moisture and air. By our invention, we are able, therefore, to make a self-sealing and self-binding article in a very compact and desirable form.

In practicing our invention, we take the whole properly roasted coffee beans, preferably hot from the roaster, so as to avoid all possible loss of aroma and volatile constituents, and place these in desired or measured quantity in a suitable press or mold. Sufficient pressure is then applied to completely crush the individual bean and to shape the unit or tablet in a very compact and finished form. This pressure breaks the cell walls of the coffee beans and liberates the oil, which in turn completely saturates the crushed fibre and in part surrounds the tablet in the press. When pressure is now relieved, and the tablet removed from the press, the free oil is completely taken up by the crushed coffee fibre and is in very favorable condition for being taken up by the hot water when coffee is made. The free oil serves several very important functions; first it acts as a binder for the crushed coffee fibre, and second, as a means for coating the fibre, and in this sense the tablet unit, or tablet, and the oil provides a finished is self-sealing, and the oil provides a finished coating for the unit which aids materially in preventing loss of the aroma and flavor of the coffee.

The press forms no part of the present invention, and may be of any desired type, but must be of sufficient capacity to fully crush the individual beans which are placed into the press cylinder, and to form these into a compact unit. Obviously any number of units may be simultaneously formed in any desired shape or size. For convenience of housholders, however, we have selected the unit of a size sufficient to make a large cup of coffee, and we find the coffee made from these units to be stronger and superior to that obtained from an equal quantity of steel cut, or pulverized coffee. It is obvious that the size and shape of the tablet may be adjusted to suit conditions, and the purpose for which it is to be used without departing from the spirit and object of our invention.

When the units or tablets have been prepared, and as they come from the press, they are put into suitable containers and sealed, preferably in vacuo. Under these conditions the coffee units will be fully preserved against deterioration, and are at all times ready for immediate use. We find that the unit or tablet disintegrates quickly when put into hot water for making coffee, and in a very short time is ready for use, without the addition of any clarifying agents. We attribute these desirable qualities to the fact that there is little or no loss of the aroma and flavor after the roasting process, and also to the very favorable conditions in which the oils and essential constituents are placed by the complete breaking and crushing of the coffee cells and fibre when the coffee unit or tablet is prepared by our process.

Our invention, therefore, offers a considerable saving, not only in the coffee and its flavor, but also in storage and shipping space. It further provides ready and most excellent means for making any desired blend or mixture. Moreover, as no foreign matter or substitution of any kind is added, and as little or no loss in flavor, or in the coffee bean itself, is sustained, any desired blend or flavor within the limits of the coffee products may be assured with reasonable certainty, and each individual can suit his own tastes within these limits.

Having now set forth the objects and nature of our invention, what we claim as new and useful and of our own invention, and desire to secure by Letters Patent, is:

1. The herein described process of forming a pure coffee unit, which consists in subjecting the whole roasted coffee bean to a crushing stress, and causing said crushed constituents to be formed into units and impregnated in its own oil.

2. The herein described process of forming self-sealing, soluble pure coffee units, which consists in subjecting the whole roasted coffee bean to a crushing stress, in a confined space, and causing the constituents of said bean to form said units impregnated in its own oil and sealed.

3. The herein described process of forming self-sealing, soluble pure coffee units, which comprises subjecting hot whole roasted coffee beans, in desired quantities, to a crushing stress, in confined spaces, to thereby disrupt the coffee cells and shape the units and saturate the same in their own oil, then relieving said stress, and causing the oily constituents to act as a sealing medium.

4. The process of forming self-sealing, soluble pure coffee units, which comprises subjecting whole roasted coffee beans, in selected quantities, to a crushing stress to crush the coffee cells and fibre in position, thereby freeing the oil to form a binding and sealing medium and shaping the units saturated in said oil, then relieving said stress and causing constituents of said beans to act as a binding and sealing medium in forming said units.

5. The herein descibed process of making coffee units, which comprises transferring hot roasted whole coffee beans directly from the roaster to a unit forming device thereby avoiding the loss of much aroma, then subjecting said beans to a crushing stress in said device to crush the coffee cells and free the oil, causing the constituents of said beans to form said units and permitting the oil to completely saturate the crushed mass to act as a binding and sealing medium.

6. A coffee unit consisting of the roasted whole pure coffee bean in crushed condition and in compressed self-sealed form.

7. A coffee unit consisting of the roasted whole pure coffee bean in crushed condition, and saturated with the oil content of said bean to thereby form a sealing-coat.

8. A coffee unit consisting of the roasted whole pure coffee bean in crushed condition and compressed form, saturated and sealed with the fluid content of said bean.

In testimony whereof we have hereunto set our hands on this 16th day of December A. D., 1920.

FRANCIS P. McCOLL.
WALTER W. WILLISON.